(No Model.)
J. P. EUSTIS.
EGG POACHER.
No. 450,564. Patented Apr. 14, 1891.
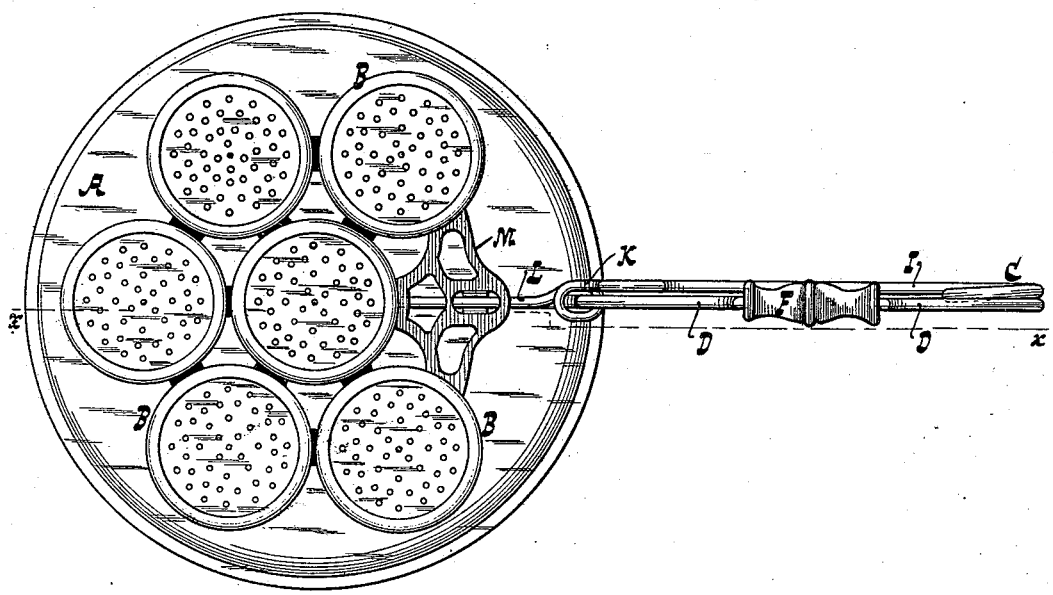
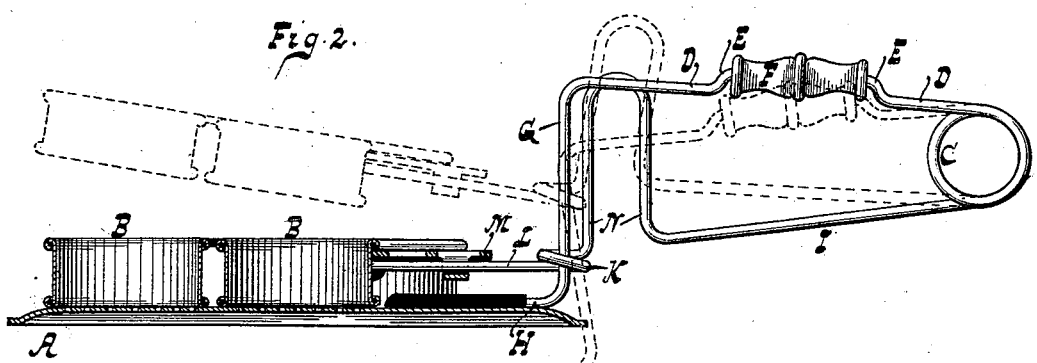
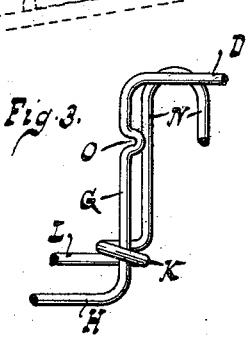
WITNESSES:
William Miller
Edward Wolff
INVENTOR:
John P. Eustis.
BY
Van Santvoord & Hauff
his ATTORNEYS

UNITED STATES PATENT OFFICE.

JOHN P. EUSTIS, OF NEW YORK, N. Y.

EGG-POACHER.

SPECIFICATION forming part of Letters Patent No. 450,564, dated April 14, 1891.

Application filed December 18, 1890. Serial No. 375,136. (No model.)

*To all whom it may concern:*

Be it known that I, JOHN P. EUSTIS, a citizen of the United States, residing at New York, in the county and State of New York, have invented new and useful Improvements in Egg-Poachers, of which the following is a specification.

This invention relates to an improvement in egg-poachers; and the invention consists in the details of construction set forth in the following specification and claims, and illustrated in the annexed drawings, in which—

Figure 1 is a plan view of an egg-poacher. Fig. 2 is a section along $x$ $x$, Fig. 1. Fig. 3 shows a modification.

In the drawings, the letter A indicates a base, and B a series of rings or a skeleton frame. The egg which is to be poached or fried is dropped into one of the rings B, so as to rest on the base A. Said base is perforated at the space within the rings.

The utensil is provided with a handle composed of a single piece of elastic wire bent into two branches joined by a spring-coil C. One branch of the handle comprises a handle portion D. This handle portion may be left plain, but it is preferable to provide said handle portion with a recess or with shoulders E, which hold in place a covering or roller F of wood or similar material suitable to the touch. Said handle branch also comprises a guiding portion G and an attaching portion H, soldered or secured to the base A. The other handle branch comprises a handle portion I, a guiding-eye K, and an attaching portion L, secured to the rings or frame B. The guiding portion G is engaged by the eye K, so that the handle branches are guided in their movement toward and from one another. When the egg is poached or prepared, the handle portions D I are grasped so as to be pressed toward one another. The frame B and base A are thereby separated, as indicated in Fig. 2 by broken lines, and the prepared egg can then be slid off the base. On releasing the spring-handle the base and frame are again brought together, and raw or unprepared eggs can thereupon be deposited on the base within the rings. The attaching portion L is provided with a spider or frame M, engaging three of the rings B, as shown, so that a firm attachment is obtained. As the handle projects laterally from the utensil, said handle is not apt to be heated by the vapors rising above base A, thus leaving the handle in condition to be grasped whenever necessary. The handle, with its spring-coil C, is readily shaped or bent from a single piece of spring-wire, and the roller F can be readily put in place while said wire is still straight, after which the shoulders E are formed on the wire so as to hold the roller F in place. The handle portion I may also be provided with a guiding portion or bends N, which slide along the portion D and prevent torsion or twisting of the portion I. The bends N also allow the utensil to be set down into a dish, the rim of the dish entering between bends N. It will be noticed that when the handle is grasped the frame is moved entirely clear of the base, so that the eggs can be slid off the base at all sides. The guiding portion G may also have a lock or recess O, Fig. 3, into which the eye K can be pressed so as to hold the base and frames separate. By moving the eye K out of the lock O the base and frame will be free to come together.

What I claim as new, and desire to secure by Letters Patent, is—

1. An egg-poacher consisting of the perforated base, a series of rings adapted to rest upon the base to receive the eggs to be poached, and a handle formed of a single piece of elastic wire bent into two branches, one branch being secured to the perforated base and the other connected with the rings for separating the rings and base when the two branches are pressed toward each other, substantially as described.

2. An egg-poacher consisting of a perforated base, a frame having a series of rings adapted to rest upon the base to receive the eggs to be poached, and a handle formed of a single piece of elastic wire bent into a connecting-coil, and two branches, one of which is attached to the ring-carrying frame and the other one extended downward and secured to the perforated base, so that the rings are lifted from the base when one of the branches is pressed toward the opposite branch, substantially as described.

3. An egg-poacher consisting of a base, a frame carrying a series of rings, and a handle formed of a single piece of elastic wire bent into two branches connected by a spring portion, one branch bent to form a guide and the other branch having a guide-eye, substantially as described.

4. The combination, with the base A and frame B, of a spring-handle having two branches, one of said handle branches comprising a handle portion D, provided with a recess or shoulders E, and a covering F, held in place by said shoulders, a guiding portion G, and an attaching portion H, the other handle branch comprising a handle portion I, a guiding-eye K, made to engage the guiding portion G, and an attaching portion L, said attaching portions H L being respectively secured to the base and to the frame, substantially as described.

5. The combination, with the base A and a frame B, of a spring-handle having two branches, one of said handle branches comprising a handle portion D, a guiding portion G, and an attaching portion H, the other handle branch comprising a handle portion I, a guiding-eye K, made to engage the guiding portion G, and an attaching portion L, and a spring-coil made to connect the handle branches, substantially as described.

6. The combination, with the base A and frame B, of a spring-handle having two branches, one of said handle branches comprising a handle portion D, a guiding portion G, and an attaching portion H, the other handle branch comprising a handle portion I, bends N, a guiding-eye K, and an attaching portion L, substantially as described.

In testimony whereof I have hereunto set my hand in the presence of two subscribing witnesses.

JOHN P. EUSTIS.

Witnesses:
  WM. C. HAUFF,
  E. F. KASTENHUBER.